(12) United States Patent
Windmöller

(10) Patent No.: US 8,071,193 B2
(45) Date of Patent: Dec. 6, 2011

(54) FLOOR PANEL

(75) Inventor: Ulrich Windmöller, Schloss Holte-Stuckenbrock (DE)

(73) Assignee: Ulrich Windmoller Consulting GmbH, Schloss-Holte-Stuckenbrock (DE)

( * ) Notice: Subject to any disclaimer, the term of this patent is extended or adjusted under 35 U.S.C. 154(b) by 0 days.

(21) Appl. No.: 11/953,131

(22) Filed: Dec. 10, 2007

(65) Prior Publication Data

US 2008/0138560 A1    Jun. 12, 2008

(30) Foreign Application Priority Data

Dec. 11, 2006   (DE) .................. 10 2006 058 655

(51) Int. Cl.
*B32B 27/08*    (2006.01)
(52) U.S. Cl. ..... 428/60; 52/506.01; 52/592.2; 52/592.4; 428/58; 428/192
(58) Field of Classification Search ............... 428/60, 428/58, 192; 52/506.01, 592.2, 592.4
See application file for complete search history.

(56) References Cited

U.S. PATENT DOCUMENTS

| | | | |
|---|---|---|---|
| 6,345,481 B1* | 2/2002 | Nelson | 52/592.2 |
| 6,991,830 B1* | 1/2006 | Hansson et al. | 427/504 |
| 2004/0003888 A1* | 1/2004 | Mott et al. | 156/269 |
| 2004/0255538 A1* | 12/2004 | Ruhdorfer | 52/506.01 |
| 2005/0281986 A1* | 12/2005 | Nam | 428/172 |
| 2007/0175137 A1* | 8/2007 | Stone et al. | 52/295 |

FOREIGN PATENT DOCUMENTS

| | | |
|---|---|---|
| DE | 19944399 A1 | 4/2001 |
| DE | 20214532 U1 | 3/2004 |
| DE | 10316886 A1 | 10/2004 |
| DE | 202004014160 U1 | 12/2004 |
| DE | 102004011531 B3 | 11/2005 |
| DE | 102005023661 A1 | 11/2006 |
| EP | 698126 | 2/1996 |
| EP | 843763 B1 | 5/1998 |
| EP | 1024234 A2 | 8/2000 |
| EP | 1036341 B1 | 9/2000 |
| EP | 12626607 A1 | 5/2001 |
| GB | 1430423 | 3/1976 |
| WO | 94/28183 A1 | 12/1994 |

* cited by examiner

*Primary Examiner* — Brent O'Hern
(74) *Attorney, Agent, or Firm* — Richard M. Goldberg

(57) ABSTRACT

The invention relates to a floor panel in the form of a multi-layer, rectangular laminate with a soft core (10) of plastic, a décor film (12) on the upper side of the core (10), a transparent finishing layer (14) and a transparent lacquer layer (16) applied on the finishing layer (16), as well as a back-pull layer (18) on the back of the core (10), with a lockable tongue and groove connection at least at two mutually opposite edges of the panel (20, 22).

8 Claims, 2 Drawing Sheets

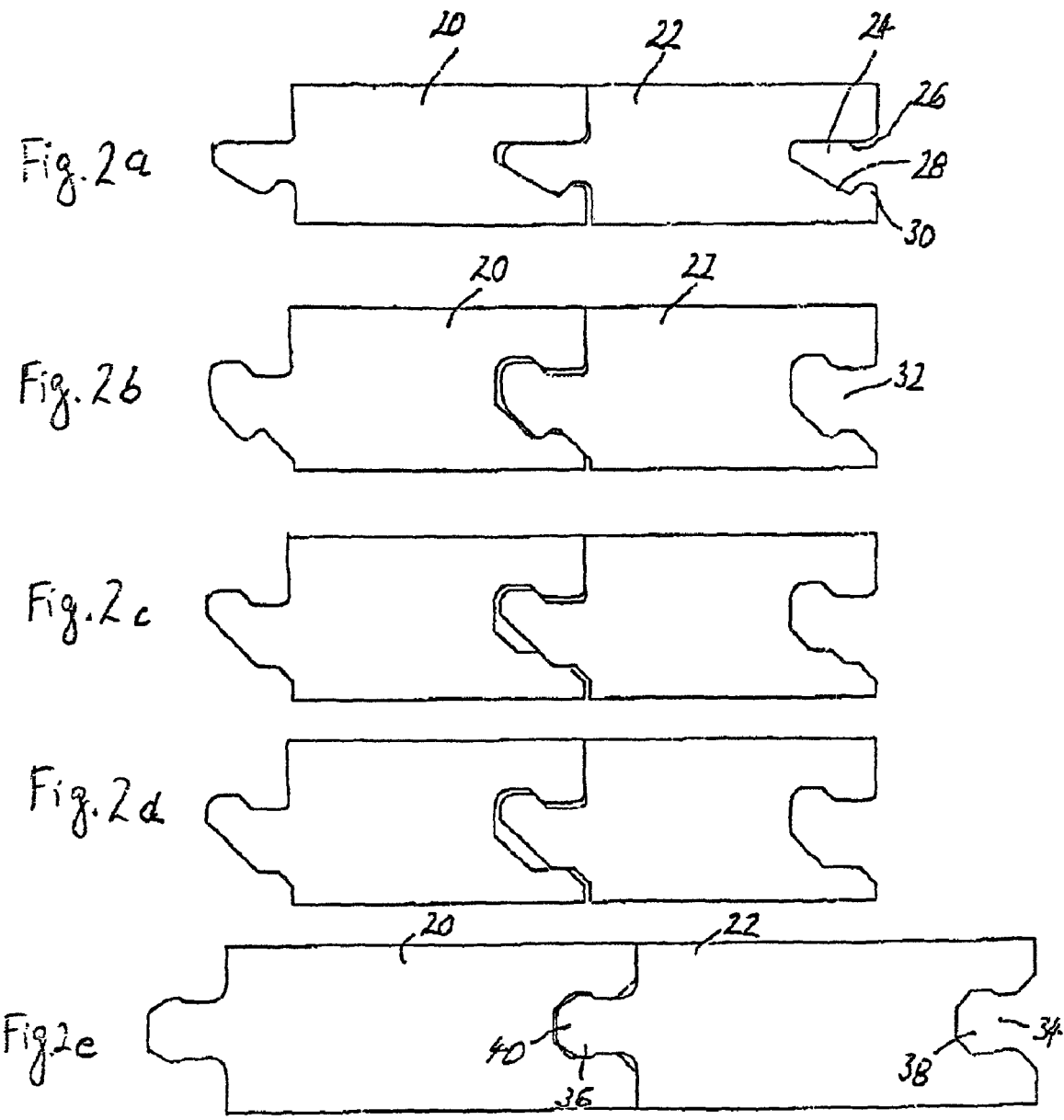

FLOOR PANEL

BACKGROUND OF THE INVENTION

The invention relates to a floor panel in the form of a rectangular plastic plate according to the introductory portion of claim 1.

A floor panel in the form of a rectangular plastic plate with tongue and groove profiling at least at two mutually opposite edges is known from the British patent 1,430,423. In comparison to a conventional tongue and groove connection, the tongue and groove profiling used has the special feature that the tongue and groove can be locked to one another so that adjacent plates can be prevented from drifting apart in the plane in which they are laid. In the present context, a connection of this type is to be referred to as a lockable tongue and groove connection.

Recently, tongue and groove connections have been employed widely in the course of the success of the so-called laminated floor panels. In practice, because of the possibility of locking adjacent panels together in a springy fashion, click connections are also mentioned in practice. The known, relevant patents include the EP 843,763 A1, the EP 1,024,234 A1, the EP 1,036,341 A1 and the EP 698,126 A1.

The known floor panels generally consist of a chipboard core (such as an MDF or an HDF core), which is covered (laminated) with a décor layer and a use surface or a finishing layer.

Laminated floors have proven to be optically appealing, advantageously priced, relatively light and flooring material, which can also be laid by lay persons. Furthermore, they are correspondingly widely spread.

Because of the high proportion of wood material in the laminated panels, it has not been possible until now to appreciably reduce the relatively high impact noise, which emanates from laminated floors.

On the other hand, plastic floor coverings are also known, which generally consist predominantly or completely of PVC and are supplied in the form of individual tiles or panels. These individual tiles or panels are glued to a solid substrate. Admittedly, these plastic floor coverings have advantages in relation to the transfer of impact noise. However, laying the individual panels by gluing them to the substrate continues to be time-consuming and labor intensive. Since dispersion adhesives are generally used for this purpose, bubbles may be formed in the floor covering because of the diffusion of vapors through the adhesive layer or also due to moisture from the substrate.

SUMMARY OF THE INVENTION

It is therefore an object of the invention, to create a floor panel of the type mentioned above, which, while retaining the advantageous impact noise properties, can be laid rapidly, simply and without problems.

This objective is accomplished by means of a wall or floor panel with the distinguishing features of claim 1.

An inventive floor panel is in the form of a multilayer rectangular laminate, which has a soft core of plastic, especially of PVC, on the upper side of which there is a décor film. A transparent finishing layer and, on the latter, a transparent lacquer layer are applied on the décor film. On the back of the panel, there is a counteracting layer. At least two mutually opposite edges are provided with a lockable tongue and groove profile.

The inventive floor panels can be laid in the same way as conventional floor panels of MDF and HDF. Because of its relatively soft core of plastic, especially of PVC or polyurethane, the material has a high degree of impact noise dampening.

An inventive floor panel is completely water-resistant and can therefore also be used for rooms, which are exposed to water and other liquids and moisture. The material does not swell after it comes into contact with a liquid.

A particularly high increase in impact noise damping can be achieved by affixing an impact noise mat to the back of the panels.

At the present time, PVC comes into consideration first of all as a material for the core and the various other layers of the inventive panel. However, the use of other plastics, such as polyurethane and polyolefin, would also be possible.

The individual layers are connected to one another by a hot laminating process. Only the UV-cured lacquer layer is applied subsequently in a separate step.

The inventive panel should be thicker than the conventional elastic floor panels. The thickness should be 4 to 8 mm. The weight should be 1.5 to 2.0 kg per mm and per $m^2$.

Connecting panels with a lockable tongue and groove profile have the advantage that an area can be laid so as to float. Moisture below the floor can be diverted to the side.

It is particularly significant that it is not necessary to glue the panels. The previously customary gluing was always associated with much contamination of the material and of the premises as well as of the personnel. It takes some time for the adhesive to dry. The evaporation during the drying generally is perceived as unpleasant. These disadvantages do not arise in the case of the inventive laying system without gluing.

After the panels are laid, the floor can be used immediately. In the case of renovations, downtimes are reduced appreciably.

PVC raw material has the negative property that, during the aging process, there is migration of the plasticizer and, with that, shrinkage. In the case of conventional, glued connections, this can lead to the formation of gaps. Since the inventive floor can be laid so as to float, any shrinkage occurring can be compensated for by the floating arrangement and the locking of the panels.

Just like previous laminated floors, an inventive floor can be taken up and used once again, making it suitable for exhibitions and stores, for presentation areas in sales spaces, in furniture stores, etc.

The inventive floor panels can be produced especially in different dimensions of conventional floor panels, for example, in sizes staggered by 10 cm from 30×30 cm to 60×60 cm. They can also be offered in strip formations ranging in length from 90 to 120 cm and in width from 7 to 22 cm.

The inventive floor panels accordingly correspond in structure essentially to the conventional laminates with an HDF or MDF core. However, they consist entirely of plastic. A plastic laminate of this type has a series of positive properties, which clearly make up for the possibly somewhat higher price, especially for certain purposes.

BRIEF DESCRIPTION OF THE DRAWINGS

In the following, preferred examples are explained in greater detail by means of the attached drawings, in which FIGS. 2a-2e show different diagrammatic partial sectional representations to explain lockable edge profiles, which can be used pursuant to the invention.

DETAILED DESCRIPTION

Figure 1:
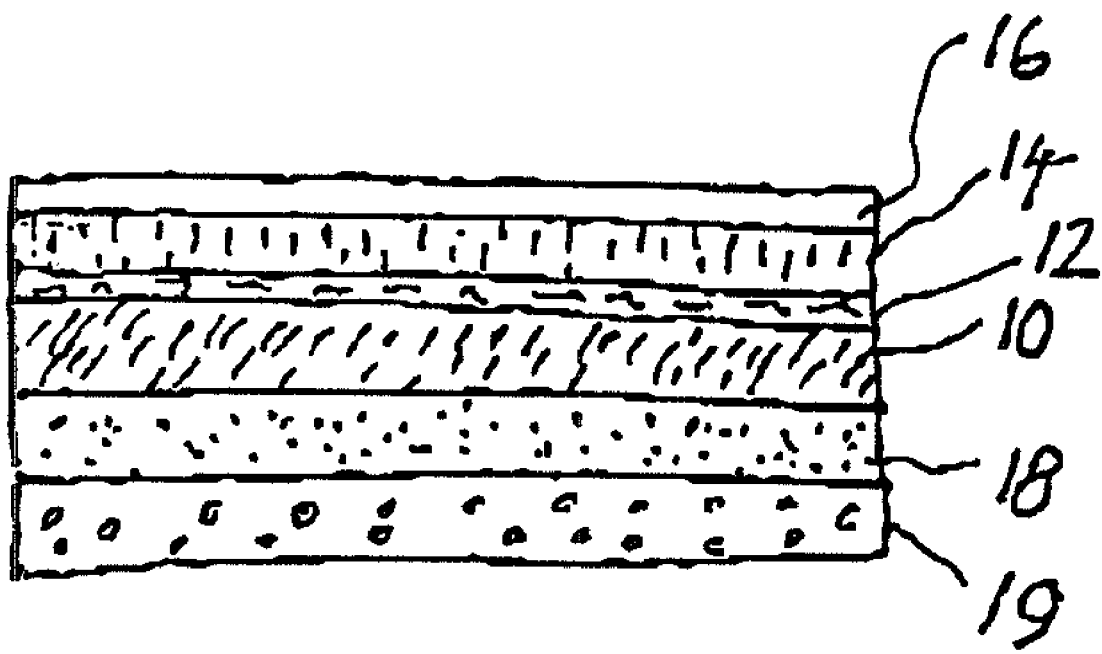
FIG. 1 shows a diagrammatic, partial section to illustrate the inner construction of the inventive floor panel

To begin with, reference is made to FIG. 1. The center of the inventive floor panel is a core 10 of a relatively highly filled, but still elastic plastic, especially PVC or polyurethane. On the core, there is a décor layer 12, such as a printed PVC film, which may be a décor of any type, for example a wood décor or also a stone décor and also any décor imaginable. The décor layer 12 is covered by a use surface or a finishing layer 14, which has a high abrasion resistance. Finally, there is a UV curable layer 16 on the surface. Curing by UV light has the particular advantage that the manufacturing process is accelerated. On the back of the panel, there is a counteracting layer, which prevents curvature of the panel during expansion and shrinkage.

At the underside of the panel, a damping layer 19 may be provided, which additionally contributes to damping the sound of steps and/or of room noise. The layer 18 of FIG. 1 may, in addition, carry out the function of a back pull and, at the same time, be a damping layer. It is, however, possible to divide the functions of a back pull layer and of a damping layer and have them carried out by two separate layers. The damping layer may be a foam layer, for example, of polyurethane. Fillers, especially mineral fillers, such as sand, chalk or the like may be present in the damping layer. These fillers increase weight and, with that, contribute to the damping. There may also be suitable fillers in the core 10.

FIG. 2 shows different examples of the edge profile, which is to be used and enables adjacent panels to be locked.

FIG. 2a shows two adjacent tiles 20-22 with a lockable tongue and groove connection. At the right side of the panel in FIG. 2a, the groove 24 has a straight flank 26, which extends parallel to the plane of the panel. The other flank 28 approaches the opposite flank 26 in the direction of the depth of the groove 24 and, at its open end, has a protrusion 30, which is directed inward in the direction of the opposite flank 26. Accordingly, this type of tongue and groove connection is partly undercut. However, it may be pressed together with a click effect, particularly since the material, as a whole, is relatively elastic and therefore deforms adequately, when two panels are to be connected with one another. The profile of FIG. 2a is a typical locking profile.

The embodiments of FIGS. 2b, 2c and 2d are similar to one another. Once again, they have a slightly undercut groove 32, which, on the whole, has a direction, rising into the interior of the material of the panels 20, 22, as well as an expanded head region at the base of the groove. Tongue and groove connections of this type can be caused to "interact" with one another, when two panels are to be connected with one another. In the case of profiles of this type, it is customary to speak of "single angle profiles". To begin with, a new panel, which is to be added, is bent slightly and, after the tongue, which is not labeled, is pressed into the groove of the new panel, lowered into the flat position. In this way, adjacent panels, overcoming the undercuts of the tongue and groove connections, can be installed relatively easily and with little expenditure of force.

The tongue includes a head having a greatest dimension measured in a transverse direction of the floor panel, and a connecting portion that connects the tongue to the core of plastic. The connecting portion has a constricted dimension in said transverse direction which is less than said greatest transverse dimension of the head to define a narrow connecting neck. The groove is provided for receiving the tongue. The groove has an open end with an inwardly directed protrusion thereat which defines a constricted opening to the groove, with the protrusion engaging the connecting portion when the tongue is inserted fully into the groove. The groove has an expanded head portion for receiving the head of the tongue and which has a greatest dimension measured in said transverse direction, and said constricted opening has a constricted dimension in said transverse direction which is less than said greatest dimension of said expanded head portion.

FIG. 2e shows a further locking profile, namely, an embodiment with a groove 34 and a tongue 36, which are close to one another in a tongue and groove connection, but have an expanded head region 38, 40. In view of the expansion of the head region, adjacent panels must be assembled with a certain pressure. The elastic material of the panels permits the tongues to be locked easily in the grooves.

The invention claimed is:

1. Floor panel in the form of a multilayer, rectangular elastic, laminate which deforms, comprising:
   a main body including:
   a core of elastic, plastic which deforms,
   a décor film on an upper side of the core,
   a transparent finishing layer on the décor film,
   a transparent lacquer layer, applied on the finishing layer,
   an elastic, back-pull layer, on a back of the core, and
   a lockable tongue and groove connection at least at two mutually opposite edges of the panel,
   wherein:
   the core is made of a polyvinyl chloride (PVC) material,
   the décor film on the upper side of the core is made of a polyvinyl chloride (PVC) material which is printed with a décor,
   the back-pull layer simultaneously acts as a sound damping layer, said back-pull layer including sound dampening fillers therein, and
   the floor panel has a thickness of 4 to 8 mm.

2. The floor panel of claim 1, wherein the lacquer layer is UV curable.

3. The floor panel of claim 1, wherein the panels have a weight per unit area of 1.5 to 2.0 kg per square meter per millimeter of thickness.

4. The floor panel of claim 1, wherein individual layers of the laminate are bonded to one another by lamination.

5. The floor panel of claim 1, wherein the fillers include at least one of:
   sand, and
   chalk.

6. Floor panel in the form of a multilayer, rectangular elastic, laminate which deforms, comprising:
   a main body including:
   a core of elastic, plastic which deforms,
   a décor film on an upper side of the core,
   a transparent finishing layer on the décor film,
   a transparent lacquer layer, applied on the finishing layer,
   an elastic, back-pull layer on a back of the core, and
   wherein:
   the core is made of a polyvinyl chloride (PVC) material,
   the décor film on the upper side of the core is made of a polyvinyl chloride (PVC) material which is printed with a decor,
   the back-pull layer simultaneously acts as a sound damping layer, said back-pull layer including sound dampening fillers therein, and
   the floor panel has a thickness of 4 to 8 mm, and
   a tongue including a head having a greatest dimension measured in a transverse direction of the floor panel, and a connecting portion that connects the tongue to the core of plastic, the connecting portion having a constricted dimension in said transverse direction which is less than said greatest transverse dimension of the head to define a narrow connecting neck; and
   a groove for receiving the tongue, the groove having an open end with an inwardly directed protrusion thereat which defines a constricted opening to the groove, with the protrusion engaging the connecting portion when the tongue is inserted fully into the groove, the groove having an expanded head portion for receiving the head of the tongue and which has a greatest dimension measured in said transverse direction, and said constricted opening having a constricted dimension in said transverse direction which is less than said greatest dimension of said expanded head portion; and the tongue and groove being formed of said core of elastic, plastic which deforms, which permits at least one of the tongue and groove to deform during insertion of the tongue into the groove.

7. The floor panel of claim 6, wherein said greatest dimension of said head is greater than said constricted dimension of said constricted opening to the groove.

8. The floor panel of claim 6, wherein the fillers include at least one of:

sand, and chalk.

* * * * *